(12) United States Patent
Aoki

(10) Patent No.: US 10,307,904 B2
(45) Date of Patent: Jun. 4, 2019

(54) POWER TOOL

(71) Applicant: MAKITA CORPORATION, Anjo-shi, Aichi (JP)

(72) Inventor: Yonosuke Aoki, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 527 days.

(21) Appl. No.: 15/012,015

(22) Filed: Feb. 1, 2016

(65) Prior Publication Data
US 2016/0221175 A1    Aug. 4, 2016

(30) Foreign Application Priority Data

Feb. 2, 2015 (JP) ................................. 2015-018753
Dec. 24, 2015 (JP) ................................. 2015-252645

(51) Int. Cl.
| | | |
|---|---|---|
| *B25F 5/00* | (2006.01) | |
| *B25F 5/02* | (2006.01) | |
| *B23D 51/16* | (2006.01) | |
| *B24B 23/04* | (2006.01) | |
| *B23D 47/00* | (2006.01) | |
| *B27B 19/00* | (2006.01) | |
| *B23D 51/10* | (2006.01) | |

(52) U.S. Cl.
CPC ............ *B25F 5/006* (2013.01); *B23D 47/005* (2013.01); *B23D 51/10* (2013.01); *B23D 51/16* (2013.01); *B24B 23/04* (2013.01); *B25F 5/00* (2013.01); *B25F 5/02* (2013.01); *B27B 19/006* (2013.01)

(58) Field of Classification Search
CPC ... B25F 5/006; B25F 5/00; B25F 5/02; B23D 47/005; B23D 51/10; B23D 51/16; B24B 23/04; B27B 19/006
USPC ........................................................ 173/216
See application file for complete search history.

(56) References Cited

U.S. PATENT DOCUMENTS

| | | | | |
|---|---|---|---|---|
| 5,027,910 A | * | 7/1991 | Honsa ..................... | B25D 17/24 173/162.1 |
| 8,162,727 B2 | * | 4/2012 | Zaiser ..................... | B24B 23/04 451/357 |

(Continued)

FOREIGN PATENT DOCUMENTS

| | | | | |
|---|---|---|---|---|
| DE | 102012103604 A1 | 10/2013 | | |
| WO | WO 2013115142 A1 | * | 8/2013 | ............. B24B 23/04 |
| WO | 2013/159901 A1 | 10/2013 | | |

OTHER PUBLICATIONS

Jul. 8, 2016 Search Report issued in European Patent Application No. EP 16 15 3679.2.

*Primary Examiner* — Michelle Lopez
(74) *Attorney, Agent, or Firm* — Oliff PLC

(57) ABSTRACT

It is an object of the invention to provide a technique for increasing the degree of freedom in designing a grip part in order to improve operability of a power tool. A representative electric vibration tool 100 is provided which mainly includes a body housing 101, an inner housing 110, a driving motor 115 and a spindle 124. A blade 145 as a tool accessory is held between the spindle 124 and a clamp shaft 127 and driven by the driving motor 115. The driving motor 115 and the spindle 124 are housed within the inner housing 110. The inner housing 110 is housed within a front region of the body housing 101. A grip part 107 is arranged behind the front region of the body housing 101.

14 Claims, 12 Drawing Sheets

(56) References Cited

U.S. PATENT DOCUMENTS

| | | | |
|---|---|---|---|
| 8,881,409 B2 * | 11/2014 | Haman | B27B 19/006 173/217 |
| 2014/0327215 A1 | 11/2014 | Thorson et al. | |
| 2015/0034347 A1 | 2/2015 | Hess et al. | |
| 2015/0144367 A1 | 5/2015 | Fruh et al. | |

* cited by examiner

POWER TOOL

TECHNICAL FIELD

The present invention relates to a power tool which performs an operation on a workpiece.

BACKGROUND ART

WO2013/159901 discloses a hand-held power tool. This power tool has an outer housing which forms a grip region to be held by a user, an electric driving unit which is housed in the outer housing, and a tool mounting part for fixedly mounting a tool accessory to the electric driving unit.

SUMMARY OF THE INVENTION

In the above-described power tool, a motor which forms the electric driving unit is housed within the grip region of the outer housing. This motor has a relatively large diameter so as to output torque required to drive the tool accessory. Therefore, the shape of the grip region is restricted to the size of the motor. From the viewpoint of improvement of operability for a user, it is preferred that the grip region is shaped to be easily gripped. In this point, further improvement is desired in the above-described known power tool.

Accordingly, it is an object of the present invention to provide a technique for increasing the degree of freedom in designing a grip part in order to improve operability of a power tool.

The above-described problem is solved by the present invention. According to a preferred embodiment of the present invention, a power tool is provided which drives a tool accessory and performs a prescribed operation on a workpiece. The power tool has a motor, a tool accessory driving shaft, an inner housing, an outer housing and an elastic member. The tool accessory driving shaft has a prescribed rotation driving axis. The tool accessory driving shaft is driven by the motor to reciprocatingly drive the tool accessory within a prescribed angular range around the rotation driving axis. Specifically, the tool accessory is reciprocatingly driven in a direction crossing the rotation driving axis. The tool accessory suitably includes plural kinds of tools such as a cutting tool for cutting a workpiece and a grinding tool for grinding a workpiece. Thus, the tool accessory performs a cutting or grinding operation by reciprocating drive (vibration) of the tool accessory within a prescribed angular range. This power tool is also referred to as a vibration tool. The inner housing houses at least part of the tool accessory driving shaft and the motor. The inner housing may be configured to house only part of the motor or its entirety. The outer housing has a first region for housing the inner housing and a second region which is held by a user during operation. The first region is also referred to as an inner housing region, and the second region is also referred to as a grip region. The elastic member is disposed between the inner housing and the outer housing and reduces transmission of vibration from the inner housing to the outer housing. Specifically, transmission of vibration is reduced by elastic deformation of the elastic member.

According to the present invention, the first region of the outer housing which houses the inner housing is provided as a different region from the second region for forming a grip which is held by a user. Therefore, it is not necessary to install a relatively large mechanism for driving the tool accessory in the second region, so that the degree of freedom in designing the shape of the second region is increased. As a result, the second region can be shaped to be easily gripped by a user. Further, by providing the elastic member between the inner housing and the outer housing, transmission of vibration from the inner housing to the outer housing is reduced. Particularly, the motor which causes vibration is not disposed in the second region, so that vibration of the motor is prevented from being directly transmitted to a user who is holding the second region.

According to a further embodiment of the power tool of the present invention, the tool accessory driving shaft is arranged in parallel to a rotation axis of the motor. Typically, a transmitting member is provided which is connected to the tool accessory driving shaft and transmits rotation of the motor to the tool accessory driving shaft. By the arrangement of the tool accessory driving shaft in parallel to the rotation axis of the motor, it is made unnecessary to provide a mechanism for decelerating the rotation of the motor or changing the motion direction, so that rotation of the motor is efficiently transmitted to the tool accessory driving shaft. More preferably, the transmitting member may be disposed closer to the tool accessory. In this case, a couple of force which is generated according to the distance between the transmitting member and the tool accessory is reduced. Thus, vibration which is caused by machining the workpiece with the tool accessory is reduced.

According to a further embodiment of the power tool of the present invention, the elastic member is arranged around a prescribed axis. Typically, the elastic member is arranged around an axis of the tool accessory driving shaft and/or a rotation axis of the motor. Preferably, the elastic member has a cylindrical shape which is arranged coaxially with a prescribed axis. Specifically, the prescribed axis is defined as an axis which is rotationally driven to drive the tool accessory. When vibration is caused by rotationally driving the axis, the elastic member which is disposed around the axis effectively reduces transmission of the vibration to the outer housing.

According to a further embodiment of the power tool of the present invention, the elastic member includes a first elastic member and a second elastic member, and the first elastic member and the second elastic member are arranged on opposite sides of the inner housing in a direction of the rotation driving axis of the tool accessory driving shaft. Typically, the first elastic member is arranged above the inner housing and the second elastic member is arranged below the inner housing when the direction in which the rotation driving axis of the tool accessory driving shaft extends is defined as a vertical direction. By this arrangement of the first and second elastic members, the inner housing is held with good balance by the elastic members.

According to a further embodiment of the power tool of the present invention, the power tool has a motor power switch for turning on and off the motor, and the motor power switch is disposed in the outer housing.

In the power tool according to this embodiment, the motor power switch is disposed in the outer housing in which transmission of vibration from the inner housing is reduced, so that the effect of vibration on the motor power switch can be reduced. More specifically, when electrodes of the motor power switch are caused to alternately and repeatedly make contact and non-contact with each other by vibration, malfunction may be caused, or the electrodes may be melted and welded with each other, but such occurrence can be prevented. Further, the motor power switch may typically be disposed in the second region.

According to a further embodiment of the power tool of the present invention, the motor power switch has a power switch operation part which is manually operated by a user, and the power switch operation part is configured to be slidable along a prescribed direction.

In the power tool according to this embodiment, the user can turn on and off the motor by sliding the power switch operation part.

According to a further embodiment of the power tool of the present invention, the power tool has a motor speed-changing switch for changing the rotation speed of the motor, and the motor speed-changing switch is disposed in the outer housing.

In the power tool according to this embodiment, the motor speed-changing switch is disposed in the outer housing in which transmission of vibration from the inner housing is reduced, so that the effect of vibration on the motor speed-changing switch can be reduced. More specifically, when electrodes of the motor speed-changing switch are caused to alternately and repeatedly make contact and non-contact with each other by vibration, malfunction may be caused, or the electrodes may be melted and welded with each other, but such occurrence can be prevented. Further, the motor speed-changing switch may typically be disposed in the second region. The motor speed-changing switch has an operation part such as a dial which is operated by a user.

According to a further embodiment of the power tool of the present invention, a battery mounting part to which a battery can be mounted is provided on a side of the second region opposite to the first region. Specifically, the relatively heavy motor and tool accessory driving shaft are arranged in the first region and the relatively heavy battery is arranged on a side of the second region opposite to the first region. With this arrangement, the center of gravity of the power tool with the battery mounted thereto is located in the second region in which the grip part to be held by a user is formed. Thus, the user can hold the vicinity of the center of gravity, so that operability of the power tool is improved.

According to the present invention, a technique for increasing the degree of freedom in designing a grip part is provided in order to improve operability of a power tool.

DETAILED DESCRIPTION OF THE EMBODIMENT OF THE INVENTION

Figure 1:
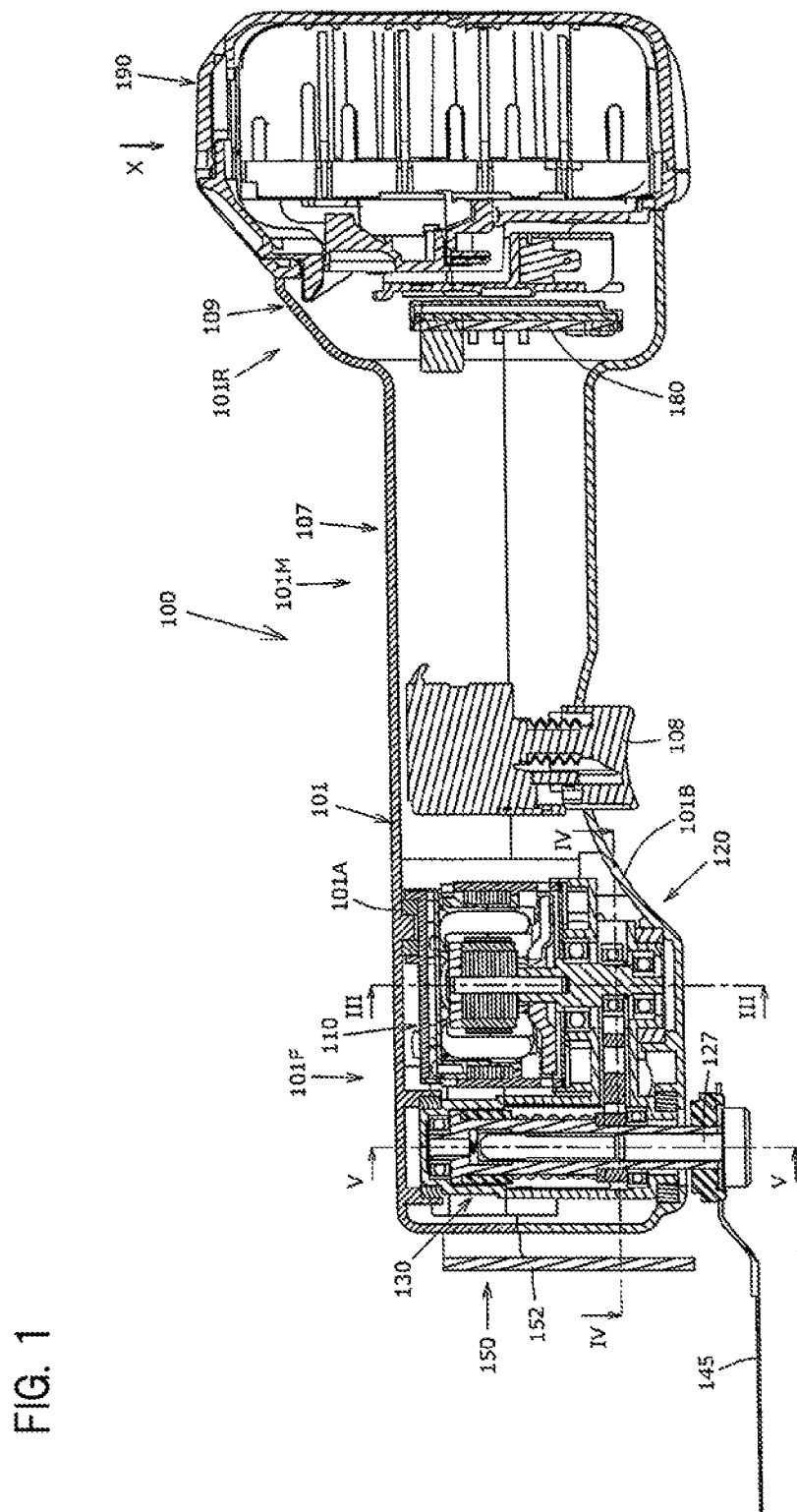
FIG. 1 is a sectional view showing the overall structure of an electric vibration tool according to a representative embodiment of the present invention.
Figure 10:
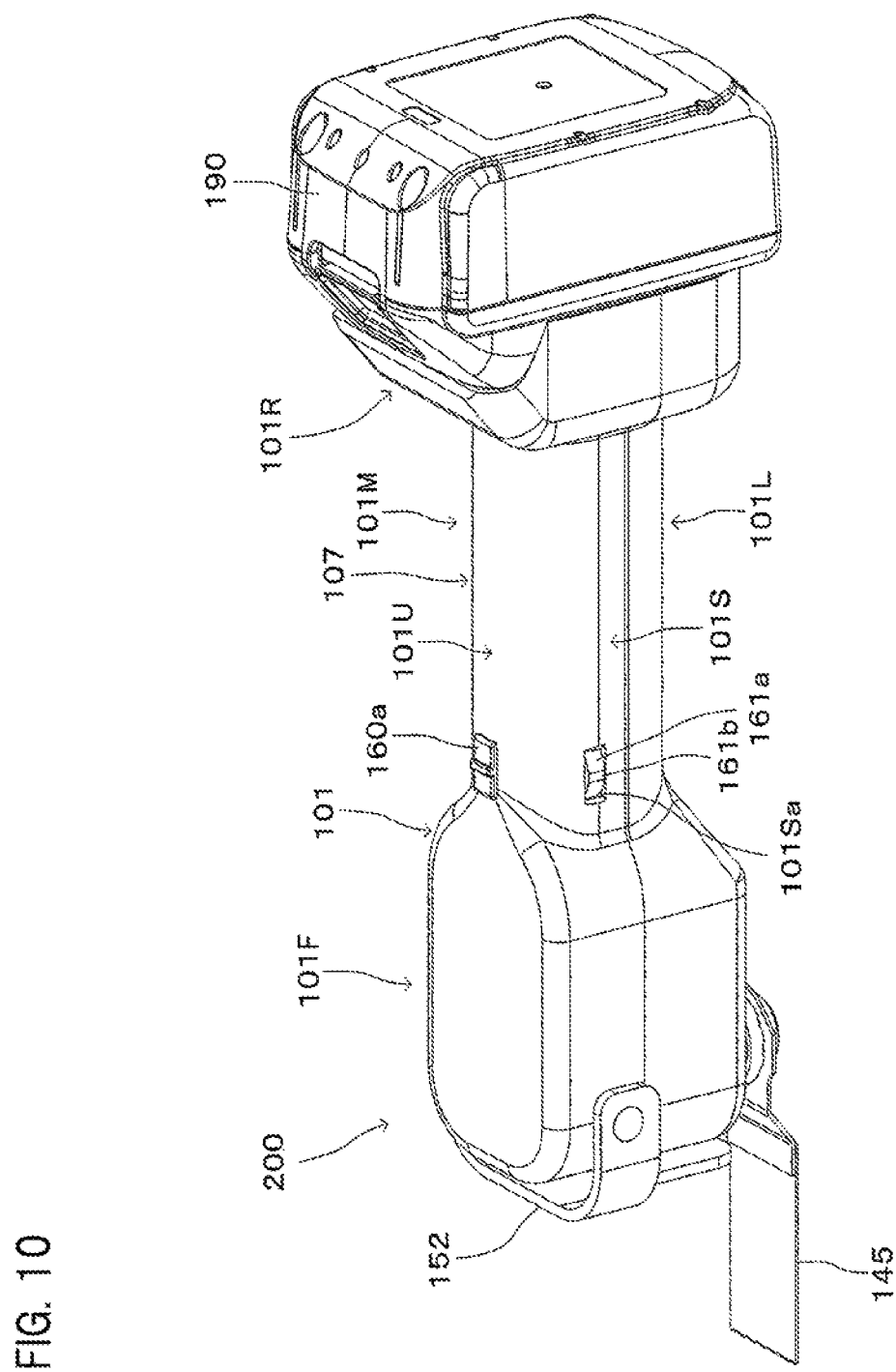
FIG. 10 is a perspective view showing a motor power switch according to another embodiment of the invention.
Figure 11:
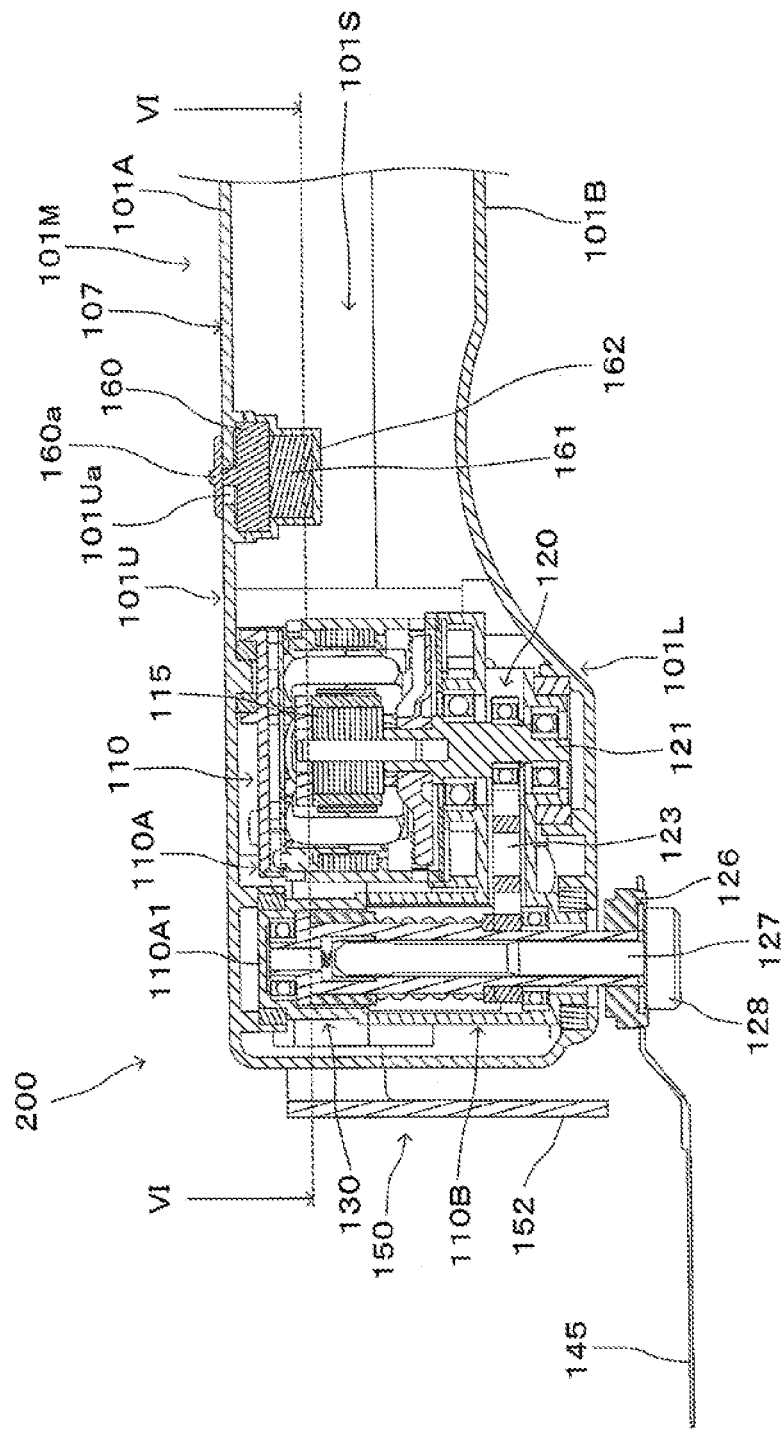
FIG. 11 is a sectional view showing the structure of the motor power switch.
Figure 12:
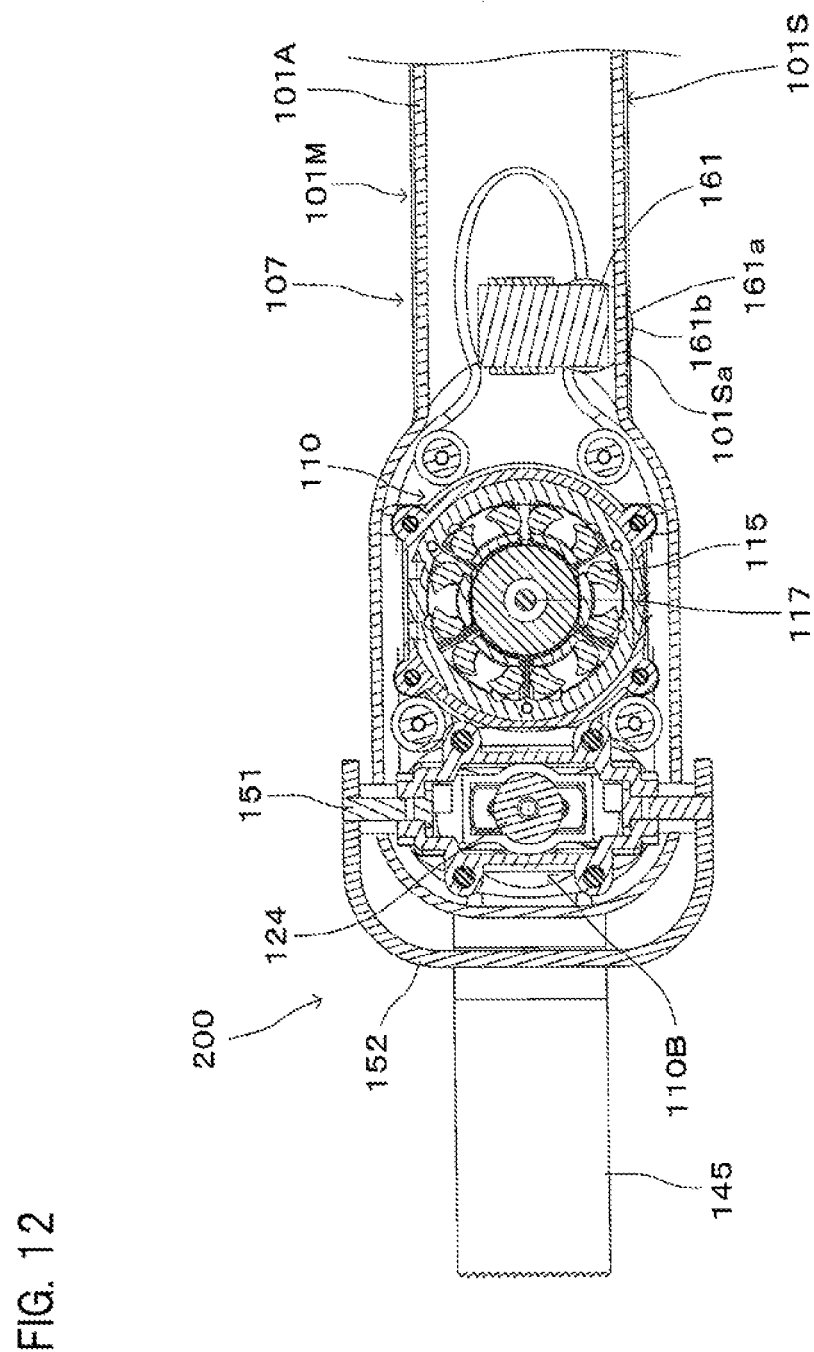
FIG. 12 is a sectional view taken along line VI-VI in FIG. 11.

A representative embodiment of the present invention is now described with reference to FIGS. 1 to 12. FIGS. 1 to 9 show a first embodiment, and FIGS. 10 to 12 show a second embodiment. In the embodiments, an electric vibration tool is described as a representative example of a power tool according to the present invention. As shown in FIG. 1, the electric vibration tool 1 is a power tool to which a tool selected from plural kinds of tools such as a blade and a polishing pad is attached, and performs an operation such as a cutting operation and a polishing operation, appropriate to the selected tool on a workpiece by vibrating the tool attached thereto. In FIG. 1, a blade 145 is attached as a representative example of the tool.

As shown in FIG. 1, the electric vibration tool 100 has a body housing 101 which forms an outer shell of the vibration tool 100. The body housing 101 is an elongate housing and has an upper housing 101A and a lower housing 101B which are joined together by screws 102 (see FIG. 4). The body housing 101 is an example embodiment that corresponds to the "outer housing" according to the present invention. The blade 145 is removably attached to one end region of the body housing 101 in its extending direction, and a battery mounting part 109 to which a battery 190 is removably mounted is provided in the other end region of the body housing 101. The battery 190 is mounted to the battery mounting part 109 by sliding in a direction of arrow X, and removed by sliding in the opposite direction. A controller 180 is disposed within the battery mounting part 109 and extends in the sliding direction of the battery 190. The battery mounting part 109 is an example embodiment that corresponds to the "battery mounting part" according to the present invention.

For the sake of expedience, the upper housing 101A side and the lower housing 101B side (upper side and lower side as viewed in FIG. 1) are taken as an upper side and a lower side of the vibration tool 100, respectively. Further, the blade 145 side and the battery mounting part 109 side (left side and right side as viewed in FIG. 1) are taken as a front side and a rear side of the vibration tool 100, respectively.

The body housing 101 forms a grip part 107 to be held by a user. The grip part 107 is provided in an intermediate region 101M between a front region 101F and a rear region 101R of the body housing 101 and forms an elongate grip extending in the front-rear direction. The intermediate region 101M of the body housing 101 is an example embodiment that corresponds to the "second region" according to the present invention. The battery 190 is attached to and detached from the battery mounting part 109 by sliding in a vertical direction crossing the extending direction (front-rear direction) of the grip part 107. A trigger 108 is provided in the grip part 107 and protrudes downward of the vibration tool 100. The trigger 108 and the battery mounting part 109 are electrically connected to the controller 180. Therefore, a driving motor 115 is turned on and off by operating the trigger 108. The controller 180 may be configured such that the rotation speed of the motor 115 is changed based on the operation amount of the trigger 108. Specifically, when the operation amount of the trigger 108 is small, the motor 115 is driven at low rotation speed, and when the operation amount of the trigger 108 is large, the motor 115 is driven at high rotation speed.

The body housing 101 houses an inner housing 110 which holds a driving mechanism 120, a clamp shaft holding mechanism 130 and a holding mechanism operation mechanism 150 in the front region 101F in front of the trigger 108. The inner housing 110 is an example embodiment that corresponds to the "inner housing" according to the present invention. Further, the front region 101F of the body housing 101 is an example embodiment that corresponds to the "first region" according to the present invention.
(Driving Mechanism)

Figure 2:
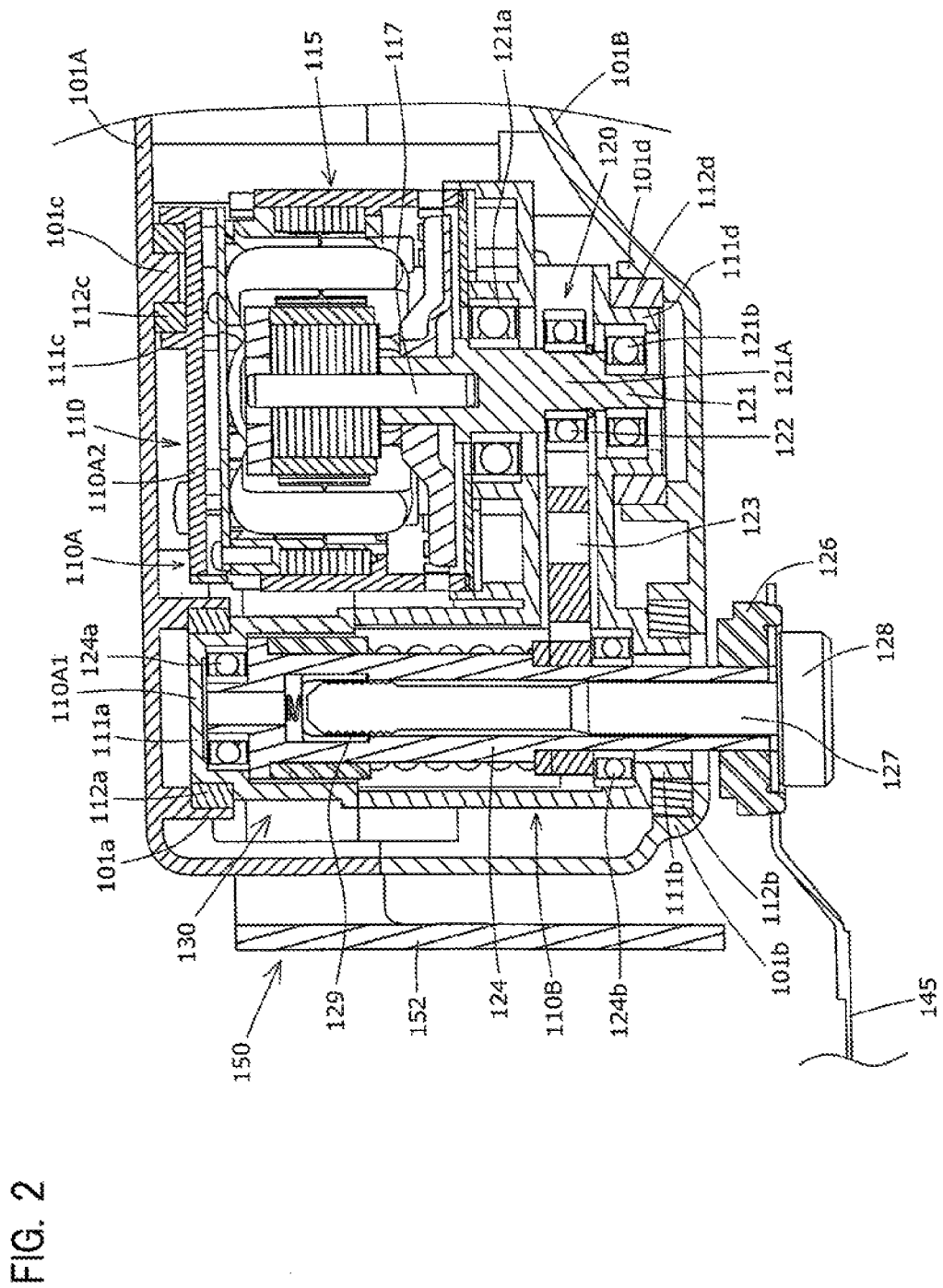
FIG. 2 is a partly enlarged sectional view showing an internal structure of the vibration tool.
Figure 3:
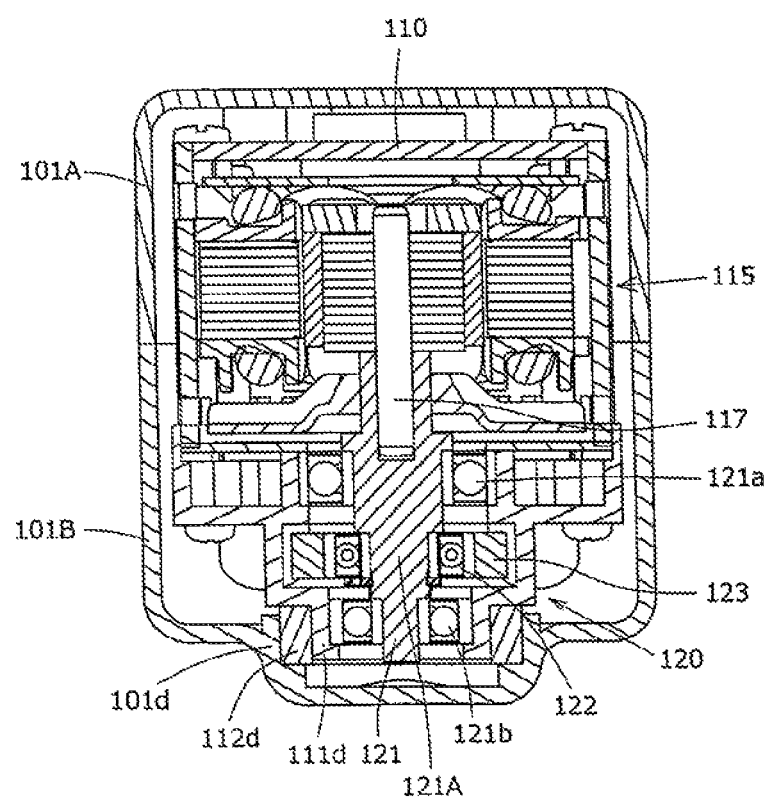
FIG. 3 is a sectional view taken along line III-III in FIG. 1.
Figure 4:
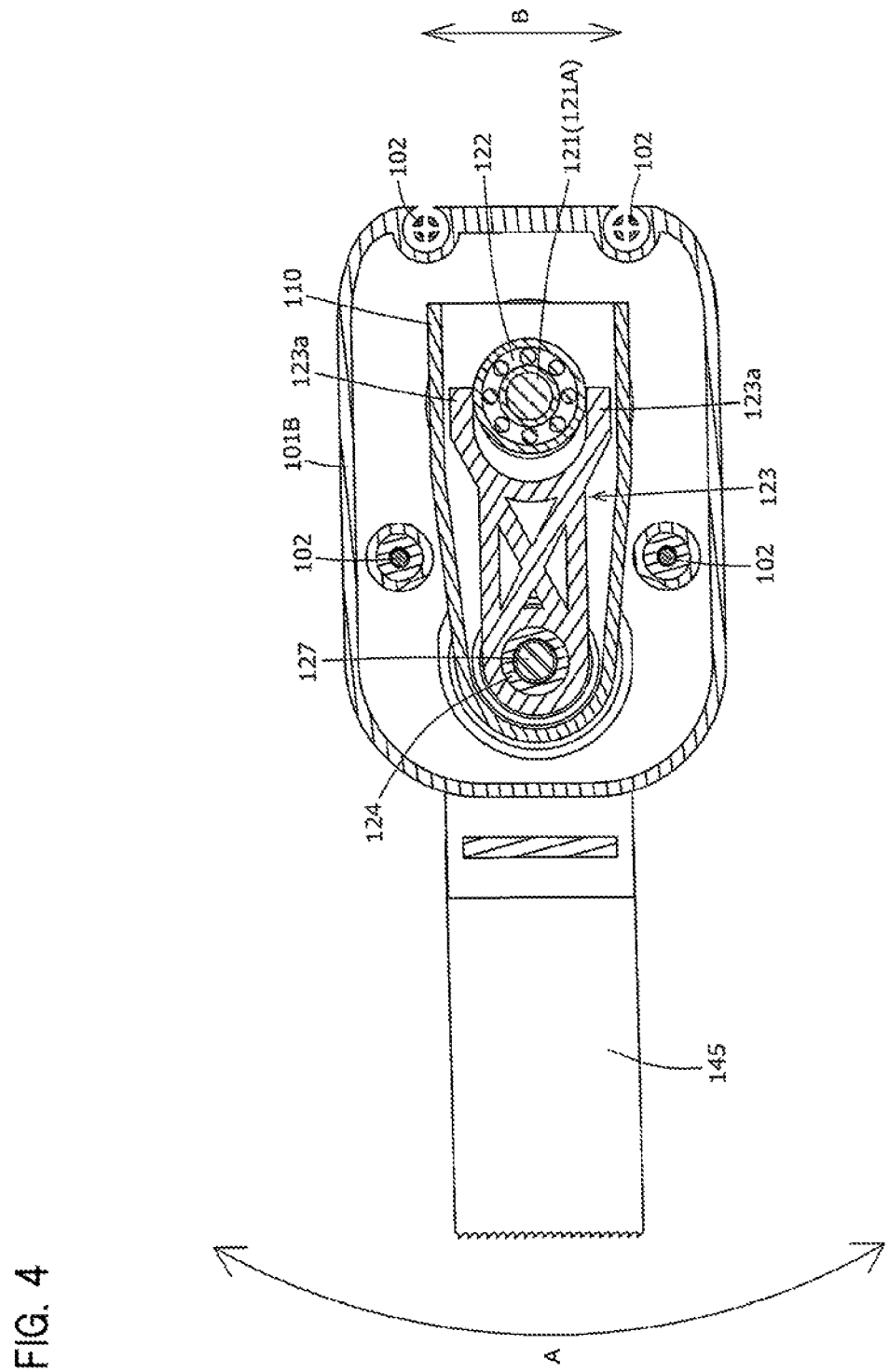
FIG. 4 is a sectional view taken along line IV-IV in FIG. 1.

As shown in FIGS. 2 to 4, a driving mechanism 120 is configured as a mechanism for driving the blade 145 (tool accessory). The driving mechanism 120 is housed within the inner housing 110 disposed within the body housing 101. The driving mechanism 120 mainly includes the driving motor 115, an eccentric shaft 121, a drive bearing 122, a driven arm 123, a spindle 124 and a clamp shaft 127.

The driving motor 115 is configured as a brushless motor. The driving motor 115 is an example embodiment that corresponds to the "motor" according to the present invention. The driving motor 115 is arranged such that an output shaft 117 vertically extends. The eccentric shaft 121 has an eccentric part 121A which is eccentric to a rotation axis of the output shaft 117. The eccentric shaft 121 is rotatably supported by an upper bearing 121a and a lower bearing 121b. The upper and lower bearings 121a, 121b are held by the inner housing 110. The drive bearing 122 is fitted on the outer periphery of the eccentric part 121A. The drive bearing 122 is disposed between the upper and lower bearings 121a, 121b.

The driven arm 123 is provided to extend in the right and left direction and connect the drive bearing 122 and the spindle 124. Two arm parts 123a are formed in a rear part of the driven arm 123. The arm parts 123a are disposed in contact with the outer periphery of the drive bearing 122. A front part of the driven arm 123 is fastened to the spindle 124.

The spindle 124 is an elongate member having a generally cylindrical hollow shape. The spindle 124 is an example embodiment that corresponds to the "tool accessory driving shaft" according to the present invention. The spindle 124 is arranged in parallel to the output shaft 117 of the driving motor 115. The spindle 124 is rotatably supported by an upper bearing 124a and a lower bearing 124b. The upper and lower bearings 124a, 124b are held by the inner housing 110. The driven arm 123 is arranged adjacent to the lower bearing 124b between the upper and lower bearings 124a, 124b. In other words, the driven arm 123 is arranged close to the blade 145 (tool accessory) held between the clamp shaft 127 and a flange 126 provided on the lower end of the spindle 124.

As shown in FIG. 2, the clamp shaft 127 is a generally cylindrical member which is inserted into the spindle 124. A flange-like clamp head 128 is integrally formed on one (lower) end of the clamp shaft 127, and clamp member engagement grooves 129 are formed in the other (upper) end part of the clamp shaft 127. When the clamp shaft 127 is inserted into the spindle 124 and held by the clamp shaft holding mechanism 130, the blade 145 is held between the clamp head 128 of the clamp shaft 127 and the flange 126 of the spindle 124.

When the driving motor 115 is driven and the output shaft 117 is rotated, the center of the eccentric part 121A moves around the rotation axis of the output shaft 117. Thus, the drive bearing 122 reciprocates in the right and left direction (vertically as viewed in FIG. 4 or in the direction of arrow B (also referred to as a direction B)), and the driven arm 123 is driven to reciprocatingly rotate on the central axis of the spindle 124 in the direction of arrow A (also referred to as a direction A). As a result, the blade 145 held between the spindle 124 and the clamp shaft 127 is driven to reciprocatingly rotate in the direction A, so that a prescribed operation such as a cutting operation can be performed.
(Clamp Shaft Holding Mechanism)

Figure 5:
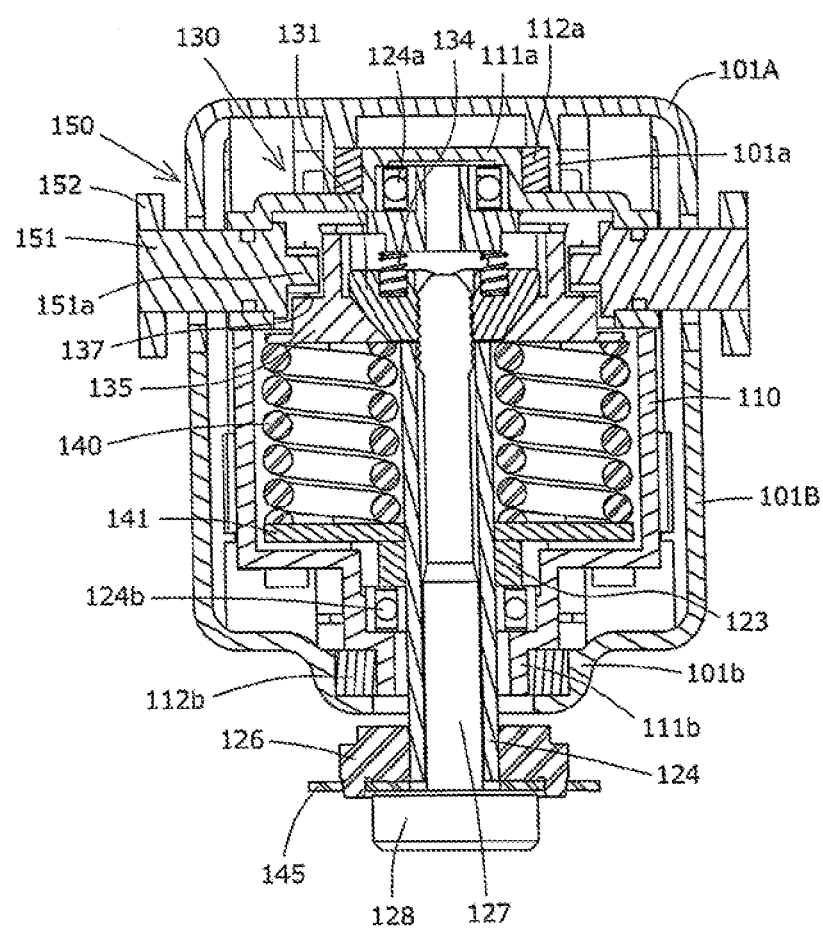
FIG. 5 is a sectional view taken along line V-V in FIG. 1.
Figure 6:
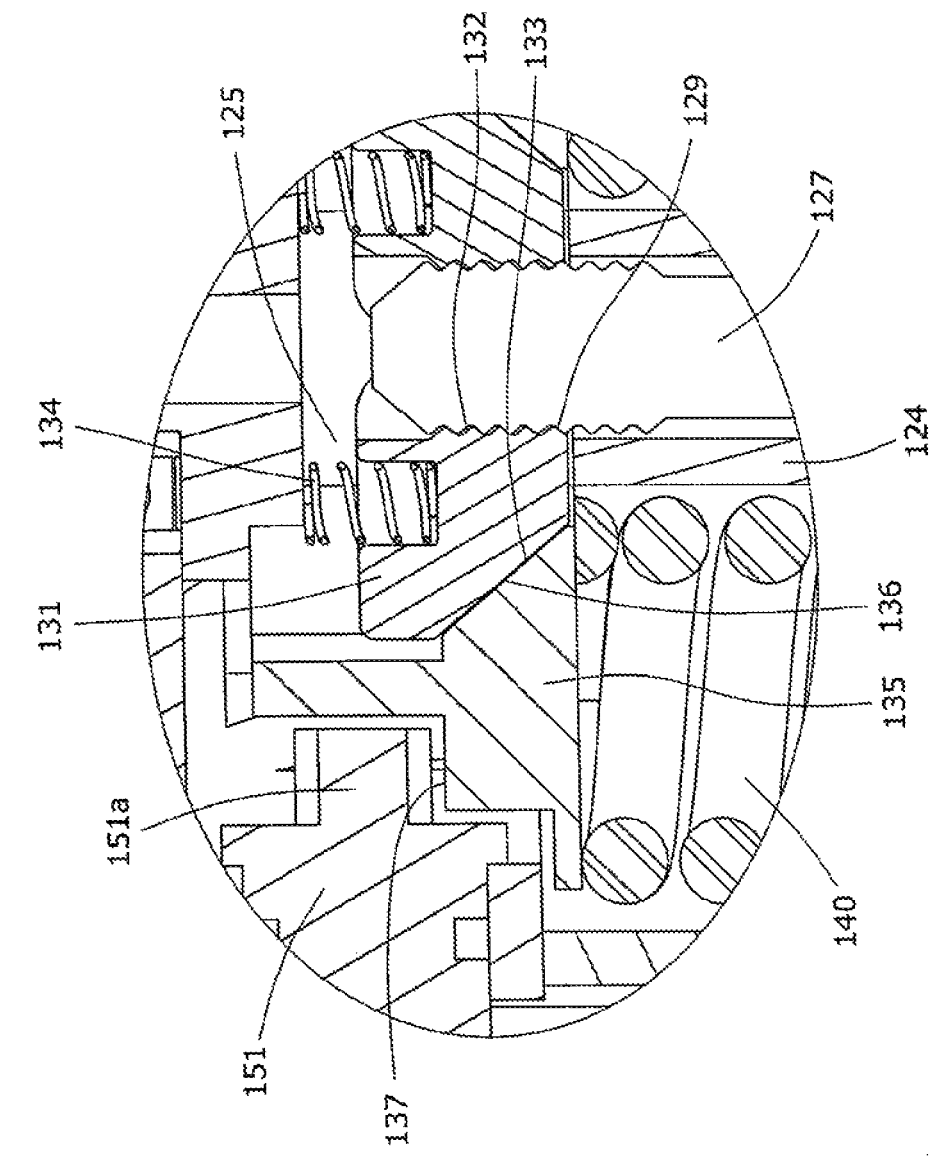
FIG. 6 is a partly enlarged sectional view of FIG. 5.

As shown in FIGS. 2, 5 and 6, the clamp shaft holding mechanism 130 serves to hold the clamp shaft 127. The clamp shaft holding mechanism 130 mainly includes a clamp member 131, a first coil spring 134, an annular member 135 and a second coil spring 140.

The clamp member 131 consists of a pair of members which hold the clamp shaft 127 in a radial direction of the clamp shaft 127. The clamp member 131 is disposed through a clamp member through hole 125 which is formed facing the spindle 124. Each clamp member 131 is configured to be movable in the radial direction of the spindle 124. As shown in FIG. 6, the clamp member 131 has a plurality of projections 132 which can engage with the clamp member engagement grooves 129 of the clamp shaft 127. The clamp member 131 further has an inclined surface 133 inclined in a longitudinal direction of the spindle 124 (vertical direction of the vibration tool 100).

As shown in FIG. 6, the first coil spring 134 is disposed between the upper end of the clamp member through hole 125 and each of the clamp members 131. The first coil spring 134 biases the clamp member 131 downward so as to stabilize the attitude of the clamp member 131.

As shown in FIG. 5, the annular member 135 serves to control clamping of the clamp shaft 127 by the clamp members 131. The annular member 135 is disposed to surround the clamp members 131 in the radial direction of the spindle 124. The annular member 135 can move along the spindle 124 in the longitudinal direction of the spindle 124.

As shown in FIG. 6, the annular member 135 has an inclined surface 136 which engages with the inclined surface 133 of the clamp member 131. Specifically, the annular member 135 has the inclined surface 136 inclined in the longitudinal direction of the spindle 124 (vertical direction of the vibration tool 100). The annular member 135 further has a shoulder part 137 which can engage with an eccentric shaft part 151a of a rotary shaft 151.

As shown in FIG. 5, the second coil spring 140 is disposed under the annular member 135 and biases the annular member 135. The second coil spring 140 is disposed on the right and left sides across the spindle 124. This arrangement of the second coil springs 140 can prevent increase of the size of the vibration tool 100 in the front-rear direction. Further, a plate-like spring receiving member 141 is provided on top of the driven arm 123 fastened to the spindle 124. Two second coil springs 140 are disposed between the spring receiving member 141 and the annular member 135. Thus, the annular member 135 is biased upward in the longitudinal direction of the spindle 124 and held by the biasing force of the second coil springs 140. Specifically, the second coil springs 140 are disposed above the driven arm 123.

As shown in FIG. 5, the annular member 135 is biased by the second coil springs 140 and the clamp member 131 is biased by the first coil springs 134, so that the inclined surface 136 of the annular member 135 engages with the inclined surface 133 of the clamp member 131. Thus, the clamp member 131 is moved inward in the radial direction of the clamp shaft 127 (the spindle 124). As a result, the two clamp members 131 hold the clamp shaft 127 in engagement between the projections 132 of the clamp members 131 and the clamp member engagement grooves 129 of the clamp shaft 127. The clamp shaft 127 is held between the clamp members 131 and biased upward by the second coil spring 140. In this manner, the blade 145 is held between the clamp head 128 of the clamp shaft 127 and the tool holding part 126 of the spindle 124.

(Holding Mechanism Operation Mechanism)

As shown in FIGS. 2, 5 and 6, the holding mechanism operation mechanism 150 serves to move the annular member 135 in the vertical direction (the longitudinal direction of the spindle 124). The clamp members 131 can be switched between the positions of holding and releasing the clamp shaft 127 by the vertical movement of the annular member 135. The holding mechanism operation mechanism 150 mainly includes the rotary shaft 151 and an operation part 152.

As shown in FIGS. 5 and 6, the rotary shaft 151 can rotate around a prescribed rotation axis extending in the right and left direction of the vibration tool 100 which is perpendicular to the longitudinal direction of the spindle 124 (the vertical direction of the vibration tool 100).

The rotary shaft 151 can engage with the annular member 135. A pair of rotary shafts 151 are disposed oppositely to each other and arranged to rotate on the same rotation axis. The eccentric shaft part 151a is formed on one end of each of the rotary shafts 151 on the clamp member 131 side in the right and left direction. The eccentric shaft part 151a is formed in a position displaced from the rotation axis of the rotary shaft 151.

Figure 7:
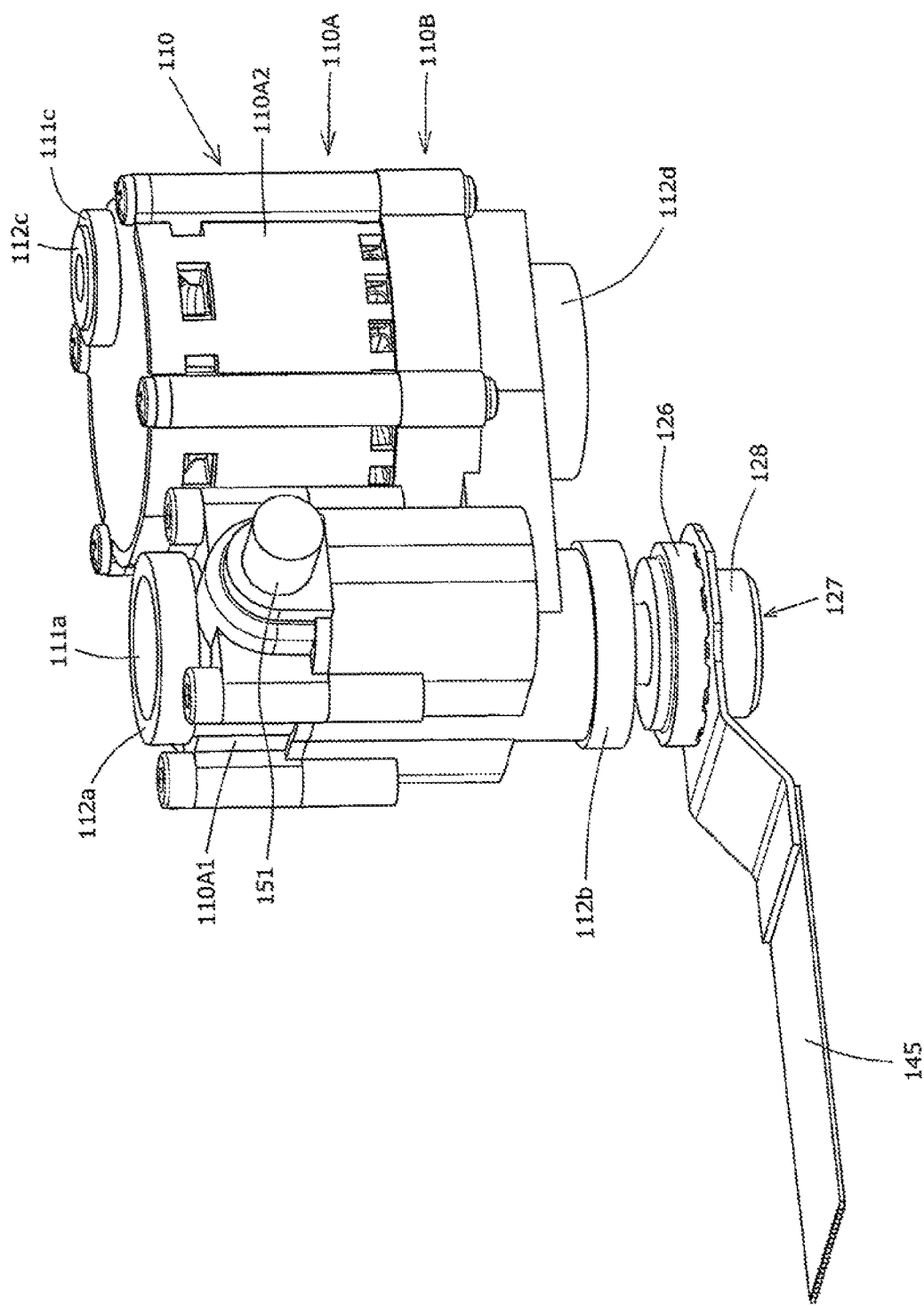
FIG. 7 is a perspective view showing an inner housing.

As shown in FIG. 7, the rotary shaft 151 is disposed through the inner housing 110 and held by the inner housing 110. As shown in FIG. 5, the rotary shaft 151 is also disposed through the body housing 101 and connected to the operation part 152 on the outside of the body housing 101. Specifically, the operation part 152 is connected to the two rotary shafts 151 on both sides of the body housing 101. When a user operates (turns) the operation part 152, the rotary shafts 151 rotate around the rotation axis. Thus, the eccentric shaft part 151a is moved in the longitudinal direction of the spindle 124 and moves the annular member 135.

When the operation part 152 is placed in a position shown in FIGS. 1 and 5, as shown in FIG. 5, the eccentric shaft part 151a does not engage with the shoulder part 137 of the annular member 135. At this time, the annular member 135 is biased upward by the second coil spring 140, so that the inclined surface 136 of the annular member 135 engages with the inclined surface 133 of the clamp member 131. Thus, the two clamp members 131 are moved toward the clamp shaft 127 and hold the clamp shaft 127. Positions in which the annular member 135 and the operation part 152 are placed when the clamp shaft 127 is clamped are defined as respective clamp positions.

Figure 8:
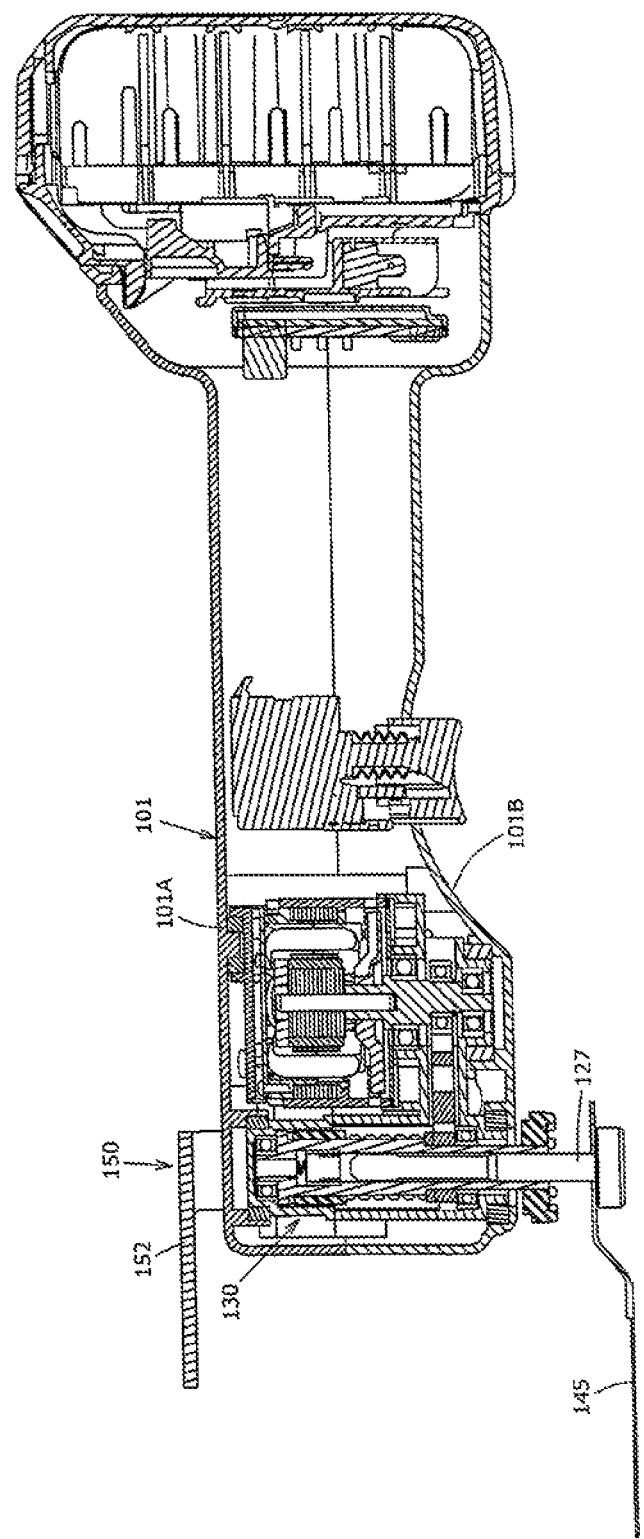
FIG. 8 is a sectional view corresponding to FIG. 1, showing a state in which a tool accessory can be removed.
Figure 9:
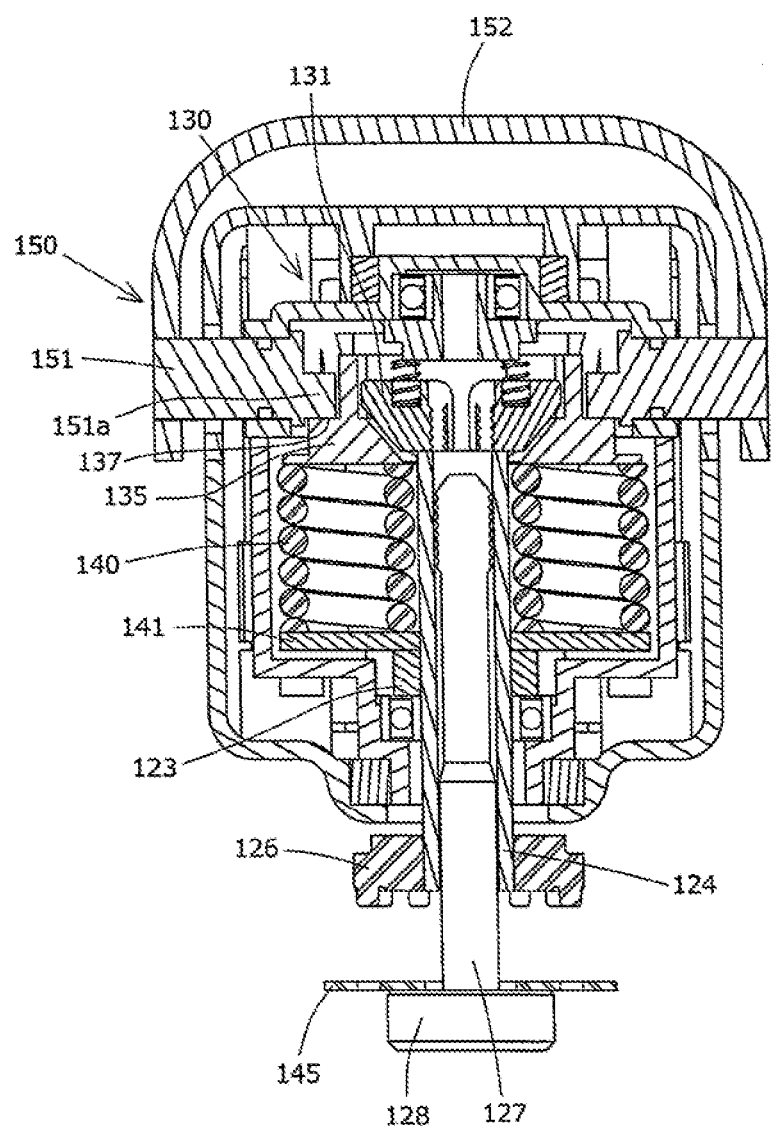
FIG. 9 is a sectional view corresponding to FIG. 5, showing the state in which the tool accessory can be removed.

When the operation part 152 is placed in a position shown in FIGS. 8 and 9, as shown in FIG. 9, the eccentric shaft part 151a engages with the shoulder part 137 of the annular member 135 and moves the annular member 135 downward against the biasing force of the second coil spring 140. As a result, the inclined surface 136 of the annular member 135 is disengaged from the inclined surface 133 of the clamp member 131. Thus, the force of clamping the clamp shaft 127 with the clamp member 131 is reduced. In this state, the clamp shaft 127 can be removed from the spindle 124 by pulling the clamp shaft 127 out downward. Positions in which the annular member 135 and the operation part 152 are placed when the clamp shaft 127 is released are defined as respective release positions. The blade 145 is also released by the release of the clamp shaft 127. Thus, the blade 145 as a tool accessory can be replaced.

As described above, the blade 145 can be removed by moving the operation part 152 from the clamp position to the release position. On the other hand, when the clamp shaft 127 is inserted into the spindle 124 with the blade 145 mounted thereto and the operation part 152 is moved from the release position to the clamp position, the clamp shaft 127 is clamped and the blade 145 is held between the clamp shaft 127 and the spindle 124.

(Vibration-Proofing Mechanism)

When the vibration tool 100 is driven, the driving mechanism 120 drives the blade 145, which causes vibration in the driving mechanism 120. Further, vibration is also caused in the blade 145 and the driving mechanism 120 connected to the blade 145 when the workpiece is machined with the blade 145. Therefore, a vibration-proofing mechanism is provided between the driving mechanism 120 and the body housing 101 in order to reduce transmission of vibration to a user who is holding the grip part 107 of the body housing 101. As shown in FIG. 2, the driving mechanism 120 is housed within the inner housing 110, and a vibration-proof rubber 112 is disposed between the inner housing 110 and the body housing 101. Specifically, a double housing structure is provided in which the inner housing 110 is housed within the body housing 101. The vibration-proof rubber 112 is an example embodiment that corresponds to the "elastic member" according to the present invention.

As shown in FIGS. 2 and 7, the inner housing 110 is configured as a housing formed of metal materials (such as aluminum and magnesium) or resin materials. The inner housing 110 is formed by connecting an upper inner housing 110A and a lower inner housing 110B with connecting means such as screws. The inner housing 110 holds the driving mechanism 120, the clamp shaft holding mechanism 130 and the holding mechanism operation mechanism 150. Specifically, the lower inner housing 110B is provided corresponding to the driving motor 115 and the spindle 124. The upper inner housing 110A includes a first upper inner housing 110A1 formed corresponding to the spindle 124 and a second upper inner housing 110A2 formed corresponding to the driving motor 115. Specifically, the spindle 124 is housed in the lower inner housing 110B and the first upper inner housing 110A1, and the driving motor 115 is housed in the lower inner housing 110B and the second upper inner housing 110A2. Further, the lower inner housing 110B is formed of metal material, and the first upper inner housing 110A1 is formed of the same metal material as the lower inner housing 110B. The second upper inner housing 110A2 is formed of resin material.

A first rubber holding part 111a and a third rubber holding part 111c are formed on the upper inner housing 110A. A second rubber holding part 111b and a fourth rubber holding part 111d are formed on the lower inner housing 110B.

The first rubber holding part 111a is configured as a cylindrical projection protruding upward. A first rubber receiving part 101a is formed on the upper housing 101A of the body housing 101 and opposed to the first rubber holding part 111a. The first rubber receiving part 101a is configured as a cylindrical recess. The first rubber holding part 111a and the first rubber receiving part 101a are formed coaxially with the spindle 124. The bearing 124a for supporting the upper end of the spindle 124 is held in the inside of the first rubber holding part 111a.

The second rubber holding part 111b is configured as a cylindrical projection protruding downward. The second rubber holding part 111b is formed coaxially with the spindle 124. A second rubber receiving part 101b is formed on the lower housing 101B of the body housing 101 and opposed to the second rubber holding part 111b. The second rubber receiving part 101b is configured as a cylindrical recess. The second rubber holding part 111b and the second rubber receiving part 101b are formed coaxially with the spindle 124.

Cylindrical first vibration-proof rubber 112a and second vibration-proof rubber 112b are fitted on the outer peripheral parts of the first and second rubber holding parts 111a, 111b, respectively. The first and second vibration-proof rubbers 112a, 112b are disposed coaxially with the spindle 124. Thus, the first vibration-proof rubber 112a is disposed between the first rubber holding part 111a and the first rubber receiving part 101a, and the second vibration-proof rubber 112b is disposed between the second rubber holding part 111b and the second rubber receiving part 101b. The first vibration-proof rubber 112a and the second vibration-proof rubber 112b are example embodiments that correspond to the "first elastic element" and the "second elastic element", respectively, according to the present invention.

The third rubber holding part 111c is configured as a cylindrical recess. A third rubber receiving part 10c is formed on the upper housing 101A of the body housing 101 and opposed to the third rubber holding part 111c. The third rubber receiving part 101c is configured as a cylindrical projection protruding downward.

A cylindrical third vibration-proof rubber 112c is fitted on the inner peripheral part of the third rubber holding part 111c. Thus, the third vibration-proof rubber 112c is disposed between the third rubber holding part 111c and the third rubber receiving part 101c. The third vibration-proof rubber 112c is an example embodiment that corresponds to the "first elastic element" according to the present invention.

The fourth rubber holding part 111d is configured as a cylindrical projection protruding downward. A fourth rubber receiving part 101d is formed on the lower housing 101B of the body housing 101 and opposed to the fourth rubber holding part 111d. The fourth rubber receiving part 101d is configured as a cylindrical recess. The fourth rubber holding part 111d and the fourth rubber receiving part 101d are formed coaxially with the output shaft 117 of the driving motor 115. The bearing 121b for supporting the lower end of the eccentric shaft 121 is held in the inside of the fourth rubber holding part 111d.

A cylindrical fourth vibration-proof rubber 112d is fitted on the outer peripheral part of the fourth rubber holding part 111d. The cylindrical fourth vibration-proof rubber 112d is disposed coaxially with the output shaft 117 of the driving motor 115. Thus, the fourth vibration-proof rubber 112d is disposed between the fourth rubber holding part 111d and the fourth rubber receiving part 101d. The fourth vibration-proof rubber 112d is an example embodiment that corresponds to the "second elastic element" according to the present invention.

In the above-described manner, the inner housing 110 is connected to the body housing 101 via the four vibration-proof rubbers 112. With this structure, transmission of vibration from the inner housing 110 to the body housing 101 is reduced. Specifically, when the vibration tool 100 is driven, transmission of vibration caused by the driving mechanism 120 to the body housing 101 is reduced. Further, transmission of vibration caused by machining the workpiece to the body housing 101 is also reduced. As a result, vibration of user's hand holding the grip part 107 is reduced, so that operability is improved.

According to the above-described embodiment, the output shaft 117 of the driving motor 115 is arranged in parallel to the spindle 124. Thus, the blade 145 as the tool accessory is disposed below the spindle 124, and the driven arm 123 which is driven by the output shaft 117 is disposed below the driving motor 115. Therefore, the tool accessory can be disposed closer to the driven arm 123 for driving the spindle 124. Accordingly, a couple of force which is generated according to the distance between the driven arm 123 and the tool accessory is reduced. Thus, vibration which is caused by machining the workpiece with the tool accessory is reduced.

Further, according to this embodiment, with the structure in which the second coil spring 140 is disposed on the outside of the spindle 124, the diameter of the spindle 124 can be reduced. Further, compared with a structure in which a single coil spring is disposed coaxially with the spindle 124, increase of the size of the vibration tool 100 in the front-rear direction can be prevented. Specifically, the second coil springs 140 are disposed on the right and left sides of the spindle 124, and no coil spring is disposed in front of the spindle 124. Therefore, part of the body housing 101 which is disposed in front of the spindle 124 can be shortened. Similarly, with the arrangement of the second coil springs 140 on the right and left sides of the spindle 124, no coil spring is disposed between the spindle 124 and the driving motor 115. Therefore, the driven arm 123 can be shortened. As a result, the vibration tool 100 can be shortened in the front-rear direction.

Further, according to this embodiment, the driving mechanism 120 is disposed in front of the trigger 108. Thus, the driving mechanism 120 for driving the tool accessory or particularly the driving motor 115 is not disposed in the grip part 107 which is held by a user. Therefore, the grip part 107 can be thinly shaped to be easily gripped, so that the operability of the vibration tool 100 is improved.

Further, according to this embodiment, with the structure in which the vibration-proof rubber 112 is disposed between the inner housing 110 and the body housing 101, transmission of vibration caused by driving the driving mechanism 120 to the body housing 101 is reduced. Further, the inner housing 110 which houses the driving mechanism 120 is disposed in a front region of the body housing 101. The controller 180 for driving and controlling the driving motor 115 is disposed in a rear region of the body housing 101. Thus, the controller 180 is disposed apart from a vibration source or the driving mechanism 120, so that the controller 180 is protected against vibration.

Further, according to this embodiment, the upper housing 101A and the lower housing 101B are joined together by the screws 102 which extend vertically in parallel to the spindle 124 and the output shaft 117 of the driving motor 115. The screws 102 are disposed by utilizing a free space laterally outward of the spindle 124 and the output shaft 117 of the driving motor 115. Thus, increase of the size of the body housing 101 (the vibration tool 100) is prevented.

Second Embodiment

A second embodiment of the present invention is now described with reference to FIGS. 10 to 12. In the second embodiment, parts and mechanisms which are identical or similar to those in the first embodiment are given like designations and numerals as in the first embodiment, and they are not described here.

An electric vibration tool 200 of the second embodiment is different from the electric vibration tool 100 of the first embodiment in the structure relating to a switch for operating the driving motor 115.

As shown in FIGS. 10 and 11, the electric vibration tool 200 has a motor power switch 160 for turning on and off the driving motor 115, and a motor speed-changing switch 161 for changing the rotation speed of the driving motor 115. The motor power switch 160 and the motor speed-changing switch 161 are electrically connected to the controller 180 (see FIG. 1). Specifically, the controller 180 controls the driving motor 115 based on signals from the motor power switch 160 and the motor speed-changing switch 161.

As shown in FIG. 10, the body housing 101 has an upper region 101U, a lower region 101L and a side region 101S between the upper and lower regions 101U, 101L. A slide operation part 160a is disposed in the upper region 101U within the intermediate region 101M and operated by the user to actuate the motor power switch 160. A dial operation part 161a is disposed in the side region 101S within the intermediate region 101M and operated by the user to manually actuate the motor speed-changing switch 161. Further, the dial operation part 161a is disposed on a plane which is defined by a direction of the rotation axis of the spindle 124 through the slide operation part 160a and a direction perpendicular to the direction of the rotation axis of the spindle 124 through the slide operation part 160a.

With the above-described structure, the user can operate the slide operation part 160a and the dial operation part 161a by one hand holding the grip part 107, so that user friendliness can be improved. The motor power switch 160, the slide operation pan 160a and the motor speed-changing switch 161 are example embodiments that correspond to the "motor power switch", the "power switch operation part" and the "motor speed-changing switch", respectively, according to the present invention.

As shown in FIG. 11, the motor power switch 160 and the motor speed-changing switch 161 are disposed adjacent to each other in a switch housing 162.

As shown in FIG. 11, the motor power switch 160 is connected to the slide operation pan 160a via an upper opening 101Ua of the upper region 101U. The slide operation part 160a is configured to be slidable along the longitudinal direction of the body housing 101 (the grip part 107). In order to allow the slide operation part 160a to slide, the upper opening 101Ua is configured to be longer in the longitudinal direction of the body housing 101 than in a direction crossing the longitudinal direction.

As shown in FIG. 10, the dial operation part 161a has a display part 1616b. Serial numbers each corresponding to a prescribed rotation speed of the driving motor are displayed in the display part 161b. More specifically, number "1" may be set as the lowest rotation speed and number "6" may be set as the highest rotation speed within a prescribed range of the rotation speed of the driving motor 115 required for machining operation. Further, numbers "2" to "5" between the numbers "1" and "6" may be set in the order of increasing the motor rotation speed. Specifically, the numbers can be associated with the rotation speed of the driving motor 115 such that the rotation speed of the driving motor 115 gradually increases as the number becomes larger. Thus, the user can obtain a desired driving speed of the blade 145 by selecting a number in the display part 161b, so that user friendliness is improved.

As shown in FIG. 12, pan of the dial operation part 161a is housed within the motor speed-changing switch 161. The side region 101S has a side opening 101Sa. A region of the dial operation part 161a exposed from the motor speed-changing switch 161 is exposed to the outside of the side region 101S through the side opening 101Sa. Thus, the user can easily visually check the display part 161b.

The electric vibration tool 200 is configured such that the motor power switch 160 and the motor speed-changing switch 161 are disposed in the body housing 101 in which transmission of vibration from the inner housing 110 is reduced. With this structure, the effect of vibration on the motor power switch 160 and the motor speed-changing switch 161 can be reduced. More specifically, when electrodes of the motor power switch 160 or the motor speed-changing switch 161 are caused to alternately and repeatedly make contact and non-contact with each other by vibration, malfunction may be caused, or the electrodes may be melted and welded with each other, but such occurrence can be prevented.

The controller 180 controls to inhibit driving of the driving motor 115 when the battery 190 is mounted in the on state of the slide operation part 160a. Further, the controller 180 controls to release the inhibition of driving of the driving motor 115 when the slide operation part 160a is switched from the on state to the off state and thereafter switched to the on state again in the driving inhibited state of the driving motor 115.

In the above-described embodiments, the electric vibration tools 100, 200 are descried as a representative example of the power tool, but the present invention is not limited to an electric vibration tool. For example, the present invention may also be applied to a power tool such as a grinder and a circular saw in which the tool accessory rotates. Further, a brushless motor is used as the driving motor 115, but a motor with a brush may be used.

In view of the nature of the above-described invention, the power tool of the present invention can have the following features. Each of the features can be used separately or in combination with the other, or in combination with the claimed invention.

(Aspect 1)

The elastic element comprises a plurality of cylindrical elastic elements and each of the elastic elements is disposed coaxially with the tool accessory driving shaft.

(Aspect 2)

The power tool comprises:

a tool accessory holding member that can move between a clamp position to clamp the tool accessory between the tool accessory holding member and the tool accessory driving shaft in order to hold the tool accessory and a release position to release the clamping of the tool accessory in order to remove the tool accessory, and a holding mechanism for holding the tool accessory holding member in the clamp position, wherein:

the holding mechanism includes an engagement member that can engage with the tool accessory holding member in the clamp position, and a biasing member that biases the engagement member so as to provide the engagement member with a force of holding the tool accessory holding member in the clamp position.

(Aspect 3)

The power tool comprises:

a transmitting member that is connected to the tool accessory driving shaft and transmits rotation of the motor to the tool accessory driving shaft, wherein:

the tool accessory is held on one end region of the tool accessory driving shaft and the engagement member is disposed on the other end region of the tool accessory driving shaft in an axial direction of the tool accessory driving shaft, and the transmitting member is connected to the tool accessory driving shaft between the ends of the tool accessory driving shaft.

(Aspect 4)

The biasing member is disposed between the one end of the tool accessory driving shaft and the transmitting member and biases the engagement member in the axial direction of the tool accessory driving shaft.

(Correspondences Between the Features of the Embodiment and the Features of the Invention)

The above-described embodiment is a representative example for embodying the present invention, and the present invention is not limited to the structures that have been described as the representative embodiment. Correspondences between the features of the embodiment and the features of the invention are as follow:

The electric vibration tool 100 is an example embodiment that corresponds to the "power tool" according to the present invention.

The body housing 101 is an example embodiment that corresponds to the "outer housing" according to the present invention.

The front region 101F is an example embodiment that corresponds to the "first region" according to the present invention.

The intermediate region 101M is an example embodiment that corresponds to the "second region" according to the present invention.

The grip pan 107 is an example embodiment that corresponds to the "second region" according to the present invention.

The battery mounting part 109 is an example embodiment that corresponds to the "battery mounting pan" according to the present invention.

The inner housing 110 is an example embodiment that corresponds to the "inner housing" according to the present invention.

The first to fourth vibration-proof rubbers 112a, 112b, 112c, 112d are example embodiments that correspond to the "elastic elements" according to the present invention.

The first vibration-proof rubber 112a and the second vibration-proof rubber 112b are example embodiments that correspond to the "first elastic element" and the "second elastic element", respectively, according to the present invention.

The third vibration-proof rubber 112c is an example embodiment that corresponds to the "first elastic element" according to the present invention.

The fourth vibration-proof rubber 112d is an example embodiment that corresponds to the "second elastic element" according to the present invention.

The driving motor 115 is an example embodiment that corresponds to the "motor" according to the present invention.

The spindle 124 is an example embodiment that corresponds to the "tool accessory driving shaft" according to the present invention.

The blade 145 is an example embodiment that corresponds to the "tool accessory" according to the present invention.

The motor power switch 160, the slide operation part 160a and the motor speed-changing switch 161 are example embodiments that correspond to the "motor power switch", the "power switch operation part" and the "motor speed-changing switch", respectively, according to the present invention.

DESCRIPTION OF NUMERALS 100, 200 electric vibration tool
101 body housing
101A upper housing
101B lower housing
101F front region
101M intermediate region
101R rear region
101U upper region
101Ua upper opening
101L lower region
101S side region
101Sa side opening
101a first rubber receiving part
101b second rubber receiving part
101c third rubber receiving part
101d fourth rubber receiving part
102 screw
107 grip part
108 trigger
109 battery mounting part
110 inner housing
110A upper inner housing
110A1 first upper inner housing
110A2 second upper inner housing
110B lower inner housing
111a first rubber holding part
111b second rubber holding part
111c third rubber holding part
111d fourth rubber holding part
112a first vibration-proof rubber
112b second vibration-proof rubber
112c third vibration-proof rubber
112d fourth vibration-proof rubber
115 driving motor
117 output shaft
120 driving mechanism
121 eccentric shaft
121A eccentric part
121a bearing
121b bearing
122 drive bearing
123 driven arm
123a arm part
124 spindle
124a bearing
124b bearing
125 clamp member through hole
126 tool holding pan
127 clamp shaft
128 clamp head
129 clamp member engagement groove
130 clamp shaft holding mechanism
131 clamp member
132 projection
133 inclined surface
134 first coil spring
135 annular member
136 inclined surface
137 shoulder part
140 second coil spring
141 spring receiving part
145 blade
150 holding mechanism operation mechanism
151 rotary shaft
151a eccentric shaft part
152 operation part
160 motor power switch
160a slide operation part (power switch operation part)
161 motor speed-changing switch 161a dial operation part
161b display pan
162 switch housing
180 controller
190 battery

What I claim is:

1. A power tool, which drives a tool accessory and performs an operation on a workpiece, comprising:
a motor,
a tool accessory driving shaft that has a rotation driving axis and is driven by the motor to reciprocatingly drive the tool accessory within a prescribed angular range around the rotation driving axis,
an inner housing that houses the motor and at least part of the tool accessory driving shaft,
an outer housing that has a first region for housing the inner housing and a second region which is different from the first region and configured to be held by a user during the operation of the power tool on the workpiece, and
an elastic member that is disposed between the inner housing and the outer housing and reduces transmission of vibration from the inner housing to the outer housing.

2. The power tool as defined in claim 1, wherein the tool accessory driving shaft has a longitudinal axis that is parallel to a rotation axis of the motor.

3. The power tool as defined in claim 1, wherein the elastic member is arranged around an axis of the tool accessory driving shaft.

4. The power tool as defined in claim 1, wherein the elastic member is arranged around a rotation axis of the motor.

5. The power tool as defined in claim 1, wherein the elastic member includes a first elastic member and a second elastic member, and the first elastic member and the second elastic member are separate members that are disposed on opposite sides of the inner housing in a direction of the rotation driving axis of the tool accessory driving shaft.

6. The power tool as defined in claim 1, comprising a motor power switch for turning on and off the motor, wherein the motor power switch is disposed in the outer housing.

7. The power tool as defined in claim 6, wherein the motor power switch has a power switch operation part which is configured to be manually operated by the user, and the power switch operation part is configured to be slidable along a prescribed direction.

8. The power tool as defined in claim 6, comprising a motor speed-changing switch for changing rotation speed of the motor, wherein the motor speed-changing switch is disposed in the outer housing.

9. The power tool as defined in claim 1, wherein a battery mounting part to which a battery can be mounted is provided on a side of the second region opposite to the first region.

10. The power tool as defined in claim 1, further comprising a plurality of separate and spaced cylindrical elastic elements, wherein each of the plurality of separate and spaced cylindrical elastic elements is disposed coaxially with the tool accessory driving shaft.

11. The power tool as defined in claim 1, further comprising:
a tool accessory holding member that can move between a clamp position to clamp the tool accessory between the tool accessory holding member and the tool accessory driving shaft in order to hold the tool accessory and a release position to release the clamping of the tool accessory in order to remove the tool accessory, and
a holding mechanism for holding the tool accessory holding member in the clamp position,
wherein the holding mechanism includes an engagement member that can engage with the tool accessory holding member in the clamp position, and a biasing member that biases the engagement member so as to provide the engagement member with a force of holding the tool accessory holding member in the clamp position.

12. The power tool as defined in claim 11, further comprising:
a transmitting member that is connected to the tool accessory driving shaft and transmits rotation of the motor to the tool accessory driving shaft, wherein:
the tool accessory is held on one end region of the tool accessory driving shaft and the engagement member is disposed on another end region of the tool accessory driving shaft in an axial direction of the tool accessory driving shaft from the one end region, and
the transmitting member is connected to the tool accessory driving shaft between ends of the tool accessory driving shaft.

13. The power tool as defined in 11, wherein the biasing member is disposed between an end of the tool accessory driving shaft and the transmitting member and biases the engagement member along the rotation driving axis of the tool accessory driving shaft.

14. A power tool, which drives a tool accessory and performs an operation on a workpiece, comprising:
a motor,
a tool accessory driving shaft that has a rotation driving axis and is driven by the motor to reciprocatingly drive the tool accessory within a prescribed angular range around the rotation driving axis,
an inner housing including:
a first portion that houses at least part of the tool accessory driving shaft,
a second portion that houses the motor, and
a partition wall that separates and is a complete barrier between the first portion and the second portion,
an outer housing that has a first region for housing the inner housing and a second region which is configured to be held by a user during the operation of the power tool on the workpiece, and
an elastic member that is disposed between the inner housing and the outer housing and reduces transmission of vibration from the inner housing to the outer housing.

* * * * *